US011872592B2

(12) United States Patent
Kojima et al.

(10) Patent No.: US 11,872,592 B2
(45) Date of Patent: Jan. 16, 2024

(54) ULTRASONIC DEVICE AND ULTRASONIC APPARATUS

(71) Applicant: Seiko Epson Corporation, Tokyo (JP)

(72) Inventors: Chikara Kojima, Matsumoto (JP); Koji Ohashi, Matsumoto (JP); Eiji Osawa, Chino (JP)

(73) Assignee: SEIKO EPSON CORPORATION

( * ) Notice: Subject to any disclaimer, the term of this patent is extended or adjusted under 35 U.S.C. 154(b) by 553 days.

(21) Appl. No.: 16/824,830

(22) Filed: Mar. 20, 2020

(65) Prior Publication Data

US 2020/0298276 A1 Sep. 24, 2020

(30) Foreign Application Priority Data

Mar. 22, 2019 (JP) ................................ 2019-054529

(51) Int. Cl.

*B06B 1/06* (2006.01)
*B06B 3/00* (2006.01)
*B06B 1/02* (2006.01)

(52) U.S. Cl.

CPC .......... *B06B 1/0666* (2013.01); *B06B 1/0215* (2013.01); *B06B 3/00* (2013.01)

(58) Field of Classification Search

CPC ............................ B06B 1/0666; B06B 1/0215
USPC ........................................................ 310/334
See application file for complete search history.

(56) References Cited

U.S. PATENT DOCUMENTS

| | | | | |
|---|---|---|---|---|
| 2003/0141783 | A1 | 7/2003 | Klee et al. | |
| 2016/0033454 | A1* | 2/2016 | Matsuda | H01L 41/08 29/25.35 |
| 2016/0089111 | A1* | 3/2016 | Yamada | G01N 29/226 600/459 |
| 2017/0179368 | A1 | 6/2017 | Sumi et al. | |
| 2018/0059067 | A1 | 3/2018 | Miyazawa et al. | |

FOREIGN PATENT DOCUMENTS

| | | | |
|---|---|---|---|
| JP | 2002-271897 | A | 9/2002 |
| JP | 2011-015423 | A | 1/2011 |
| JP | 2017-118611 | A | 6/2017 |
| JP | 2018-029748 | A | 3/2018 |

* cited by examiner

*Primary Examiner* — Derek J Rosenau
(74) *Attorney, Agent, or Firm* — Harness, Dickey & Pierce, P.L.C.

(57) ABSTRACT

An ultrasonic device includes a base material that has an opening, a vibration plate that is provided on the base material and closes the opening, and a piezoelectric element that is provided on the vibration plate, in which the vibration plate has a first layer provided on the base material, and a second layer that is disposed between the first layer and the piezoelectric element and that suppresses diffusion of a component contained in the piezoelectric element, and a bending rigidity of the second layer is equal to or larger than a bending rigidity of the first layer.

8 Claims, 6 Drawing Sheets

ULTRASONIC DEVICE AND ULTRASONIC APPARATUS

The present application is based on, and claims priority from JP Application Ser. No. 2019-054529, filed Mar. 22, 2019, the disclosure of which is hereby incorporated by reference herein in its entirety.

BACKGROUND

1. Technical Field

The present disclosure relates to an ultrasonic device and an ultrasonic apparatus.

2. Related Art

In the related art, there is an ultrasonic apparatus including a substrate provided with an opening, a vibration plate provided on the substrate to close the opening, and an ultrasonic device laminated on the vibration plate (for example, refer to JP-A-2002-271897).

In the ultrasonic apparatus disclosed in JP-A-2002-271897, the vibration plate is formed by laminating a membrane made of $SiO_2$ and a barrier layer made of $ZrO_2$, and a piezoelectric layer made of PZT or the like is laminated on the barrier layer. In this configuration, a chemical interaction between an electrode layer formed in or on the membrane and the piezoelectric layer, that is, diffusion of Pb can be prevented by the barrier layer. In the ultrasonic apparatus disclosed in JP-A-2002-271897, the barrier layer has a bending rigidity less than that of the membrane.

However, in JP-A-2002-271897, a Young's modulus of $SiO_2$ forming the membrane is lower than a Young's modulus of $ZrO_2$ forming the barrier layer. Therefore, in order to make the bending rigidity of the barrier layer less than the bending rigidity of the membrane, it is necessary to make a thickness of the membrane considerably large. In this case, a thickness of the vibration plate is increased, and thus there is a problem in that drive characteristics of the ultrasonic device change.

For example, a resonance frequency of the ultrasonic device increases, and thus transmission and reception of ultrasonic waves with a desired frequency are difficult. When a width of an opening is increased to reduce a resonance frequency, displacement efficiency of the vibration plate deteriorates. In this case, when an ultrasonic wave is transmitted, power of the transmitted ultrasonic wave is reduced, and, when an ultrasonic wave is received, a reception sensitivity is reduced.

SUMMARY

An ultrasonic device according to a first application example includes a base material that has an opening; a vibration plate that is provided on the base material and closes the opening; and a piezoelectric element that is provided on the vibration plate, in which the vibration plate has a first layer provided on the base material and a second layer disposed between the first layer and the piezoelectric element, and a bending rigidity of the second layer is equal to or larger than a bending rigidity of the first layer.

In the ultrasonic device according to the application example, a width of the opening may be equal to or less than 100 μm.

In the ultrasonic device according to the application example, the second layer may have a thickness equal to or more than a predetermined defined value such that piezoelectric characteristics of the piezoelectric element is maintained.

The ultrasonic device according to the application example may further include an ultrasonic transducer that includes a vibration portion closing the opening in the vibration plate and the piezoelectric element, and, when a resonance frequency of the ultrasonic transducer is a first frequency when a thickness of the second layer is set to the defined value, and the bending rigidity of the first layer is the same as the bending rigidity of the second layer, the thickness of the second layer may be set to the defined value when the resonance frequency of the ultrasonic transducer is lower than the first frequency.

The ultrasonic device according to the application example may further include a vibration attenuation layer having a thickness corresponding to the resonance frequency is provided on the vibration plate when the resonance frequency of the ultrasonic transducer is lower than a second frequency lower than the first frequency.

In the ultrasonic device according to the application example, the first layer may be made of $SiO_2$, and the second layer may be made of $ZrO_2$.

An ultrasonic apparatus according to a second application example includes the ultrasonic device according to the first application example; and a controller that controls the ultrasonic device.

DESCRIPTION OF EXEMPLARY EMBODIMENTS

Hereinafter, an embodiment will be described.

Figure 1:
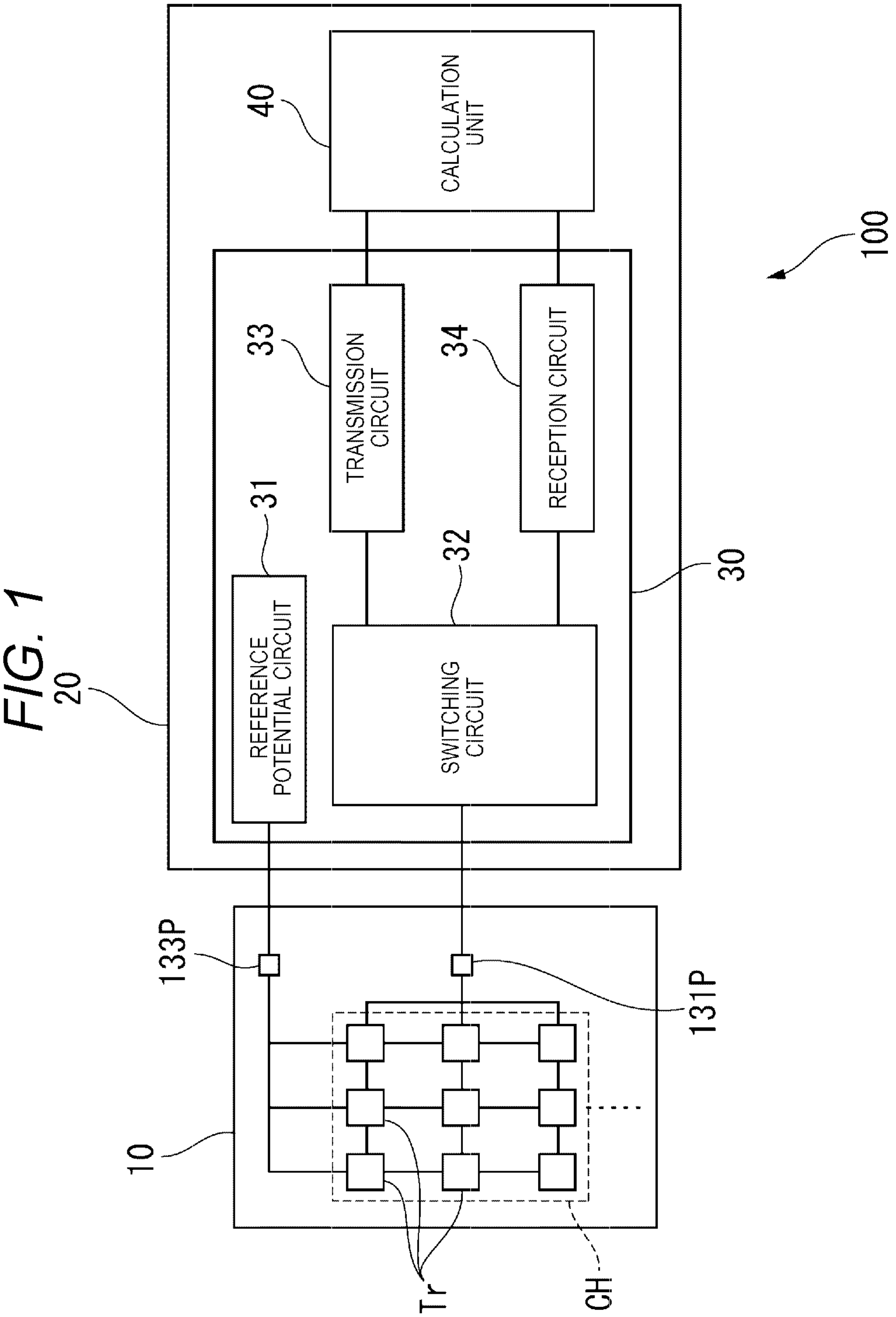
FIG. 1 is a block diagram illustrating a schematic configuration of an ultrasonic apparatus of an embodiment.

FIG. 1 is a block diagram illustrating a schematic configuration of an ultrasonic apparatus 100 of the present embodiment.

As illustrated in FIG. 1, the ultrasonic apparatus 100 of the present embodiment includes an ultrasonic device 10, and a controller 20 controlling the ultrasonic device 10. In the ultrasonic apparatus 100 of the present embodiment, the controller 20 controls the ultrasonic device 10 via a drive circuit 30, and transmits an ultrasonic wave to a target object from the ultrasonic device 10. When the ultrasonic wave is reflected by the target object, and thus a reflected wave is received by the ultrasonic device 10, the controller 20 calculates a distance from the ultrasonic device 10 to the target object based on a period of time from a transmission timing of the ultrasonic wave to a reception timing of the ultrasonic wave.

Hereinafter, a configuration of the ultrasonic apparatus 100 will be described in detail.

Configuration of Ultrasonic Device 10

Figure 2:
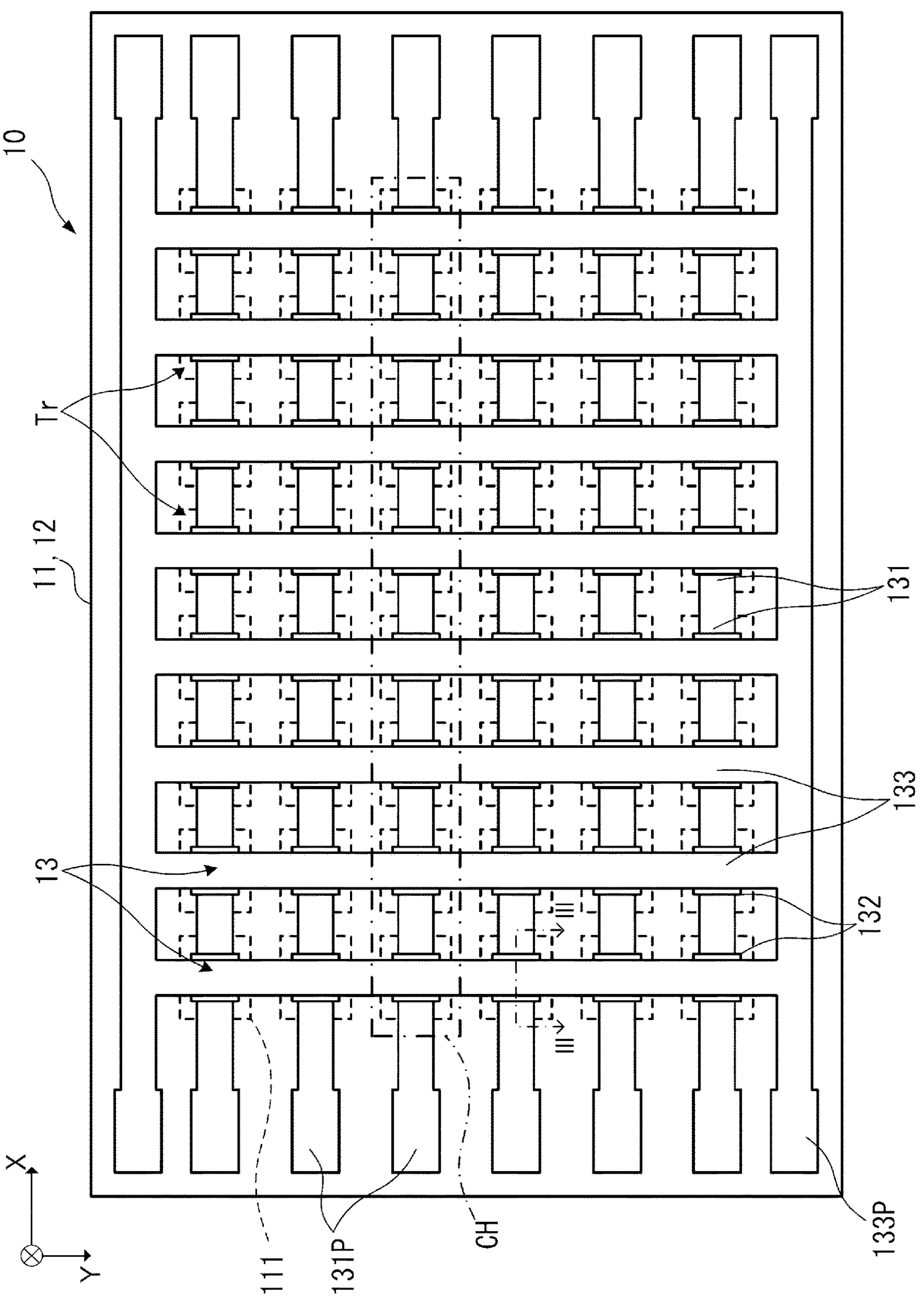
FIG. 2 is a schematic plan view illustrating an ultrasonic device of the present embodiment.
Figure 3:
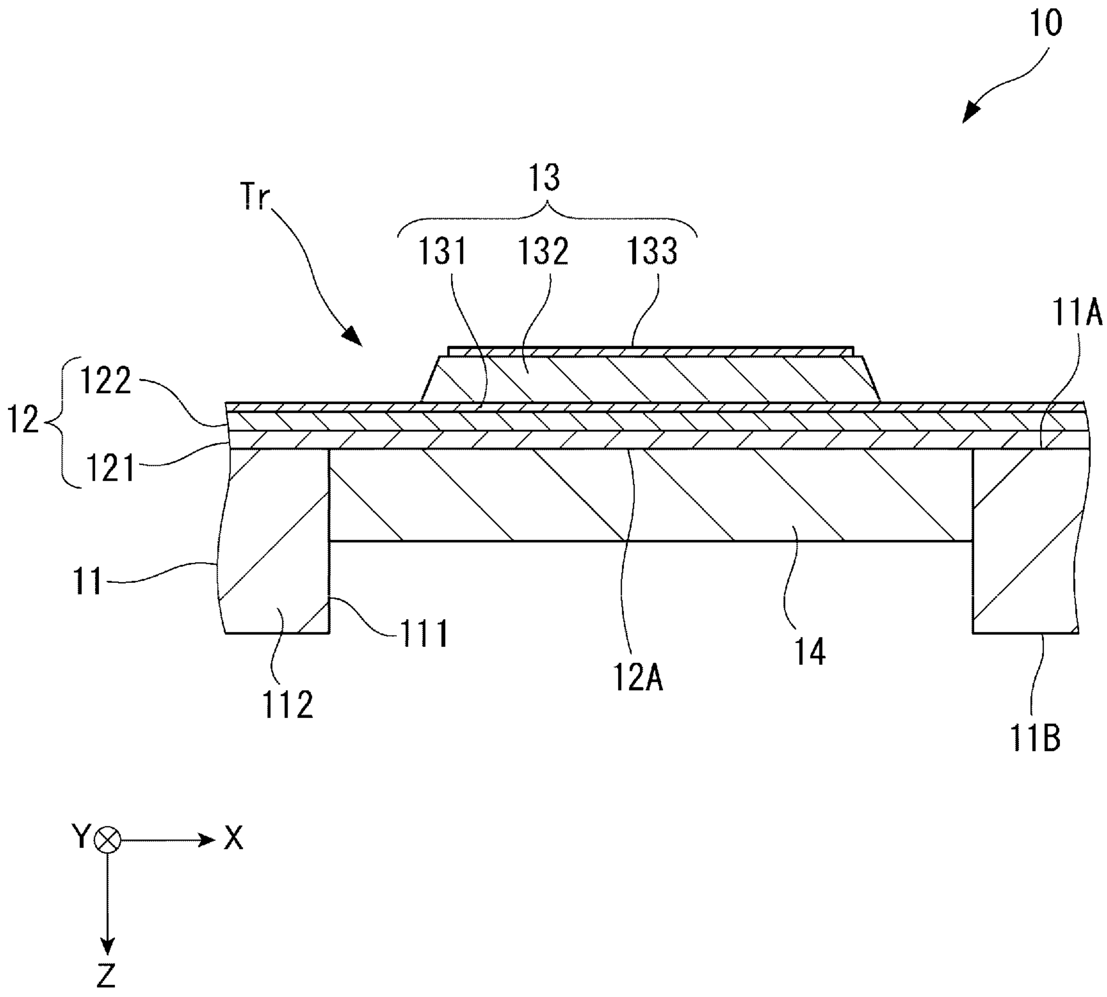
FIG. 3 is a sectional view of the ultrasonic device taken along the line III-III in FIG. 2.

FIG. 2 is a schematic plan view illustrating the ultrasonic device 10. FIG. 3 is a sectional view of the ultrasonic device 10 taken along the line III-III in FIG. 2.

As illustrated in FIG. 3, the ultrasonic device 10 is configured to include an element substrate 11 that is a base material, a vibration plate 12, and a piezoelectric element 13.

Configuration of Element Substrate 11

The element substrate 11 is a substrate that is made of Si and has a predetermined thickness for supporting the vibration plate 12. The element substrate 11 has a first surface 11A and a second surface 11B on an opposite side to the first surface 11A. Here, in the following description, a direction from the first surface 11A toward the second surface 11B is set to a Z direction, a direction orthogonal to the Z direction is set to an X direction, and a direction orthogonal to the X direction and the Z direction is set to a Y direction. The first surface 11A and the second surface 11B are surfaces parallel to an XY plane. In the present embodiment, as an example, the Y direction is orthogonal to the X direction, but the Y direction may be inclined at angles other than 90° with respect to the X direction. In the following description, regarding the X direction, the Y direction, and the Z direction, a case not including a direction may also be referred to as a case assumed to include a direction.

The element substrate 11 is provided with a plurality of openings 111 disposed in a two-dimensional array form along the X direction and the Y direction. The openings 111 are through-holes penetrating through the element substrate 11 from the first surface 11A to the second surface 11B in the Z direction.

The vibration plate 12 is provided on the first surface 11A of the element substrate 11, and an end of the opening 111 on the −Z side is closed by the vibration plate 12. In other words, a portion of the element substrate 11 not provided with the openings 111 forms a wall portion 112, and the vibration plate 12 is laminated on the wall portion 112.

A vibration attenuation layer 14 may be provided in the opening 111 of the element substrate 11 as necessary. The vibration attenuation layer 14 is made of an elastomer such as a silicon rubber, and has a Young's modulus sufficiently lower than that of a first layer 121 or a second layer 122 (which will be described later) of the vibration plate 12. The vibration attenuation layer 14 is provided to be in contact with the vibration plate 12 in the opening 111 and thus suppresses vibration of the vibration plate 12.

Specifically, a thickness of the vibration attenuation layer 14 is from 10 μm to 30 μm, and is formed to satisfy the following Equation (1) when a resonance frequency of an ultrasonic transducer Tr is f, and a thickness of the vibration attenuation layer 14 is d.

$$f=\alpha\times d+\beta \tag{1}$$

Here, α and β are coefficients generally determined depending on constituent materials of the first layer 121 and the second layer 122. When the first layer is made of $SiO_2$, and the second layer is made of $ZrO_2$, α is −8.12, and β is 789. The coefficients α and β may be easily calculated according to a finite element method.

In FIG. 3, as an example, the vibration attenuation layer 14 is configured to be provided in the opening 111, but is not limited thereto. The vibration attenuation layer 14 may be provided to cover the piezoelectric element 13 on the opposite side to the element substrate 11 on the vibration plate 12.

Configuration of Vibration Plate 12

The vibration plate 12 is provided on the first surface 11A of the element substrate 11 as described above. In other words, the vibration plate 12 is supported at the wall portion 112, and closes the openings 111. Here, the ultrasonic transducer Tr is formed by a vibration portion 12A that is a portion closing the opening 111 in the vibration plate 12, and the piezoelectric element 13 laminated on the vibration portion 12A.

A thickness dimension of the vibration plate 12 is sufficiently smaller than a thickness dimension of the element substrate 11.

More specifically, the vibration plate 12 has the first layer 121 and the second layer 122 laminated on the first layer 121.

The first layer 121 is made of $SiO_2$. In the present embodiment, the element substrate 11 is made of Si, and the first layer 121 made of $SiO_2$ is formed by performing thermal oxidation treatment on the first surface side of the element substrate 11. The element substrate 11 is subjected to etching treatment from the second surface side by using the first layer 121 made of $SiO_2$ as an etching stopper, and thus the element substrate 11 having the opening 111 and the wall portion 112 is formed.

The second layer 122 is made of $ZrO_2$. The second layer 122 is formed by laminating a Zr layer on the first layer 121 and performing thermal oxidation treatment on the Zr layer.

The second layer 122 is a layer suppressing diffusion of Pb atoms of the piezoelectric element 13 made of PZT or the like. The second layer 122 having a sufficient thickness is provided, and thus piezoelectric characteristics of the piezoelectric element 13 can be maintained.

In the present embodiment, the second layer 122 has a Young's modulus higher than that of the first layer 121, and a bending rigidity of the second layer 122 is larger than a bending rigidity of the first layer 121.

A detailed description of a bending rigidity ratio between the first layer 121 and the second layer 122 will be described later.

Configuration of Piezoelectric Element 13

The piezoelectric element 13 is provided on a surface of the vibration portion 12A of the vibration plate 12 on the opposite side to the element substrate 11.

Figure 4:
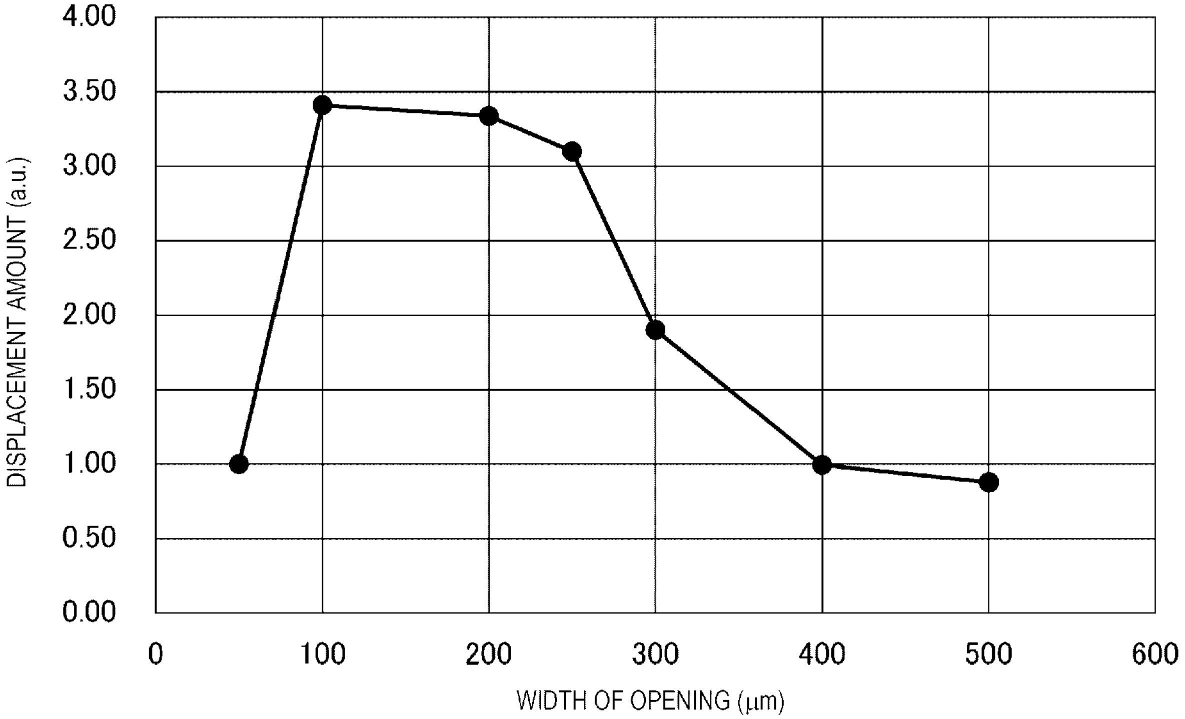
FIG. 4 is a graph illustrating a relationship between a width of an opening and a displacement amount of a vibration portion.

More specifically, as illustrated in FIGS. 3 and 4, the piezoelectric element 13 is formed by laminating a first electrode 131, a piezoelectric membrane 132, and a second electrode 133 in this order on the vibration plate 12.

The piezoelectric membrane 132 in the present embodiment is made of a perovskite type transition metal oxide containing Pb, which is, for example, PZT consisting of Pb, Zr, and Ti in the present embodiment.

The piezoelectric element 13 extends and contracts when a voltage is applied between the first electrode 131 and the second electrode 133. The piezoelectric element 13 extends and contracts such that the vibration portion 12A of the vibration plate 12 on which the piezoelectric element 13 is provided vibrates, and thus an ultrasonic wave is transmitted from the ultrasonic transducer Tr.

When an ultrasonic wave is input to the vibration portion 12A from the opening 111, the vibration portion 12A vibrates, and thus a potential difference occurs between the upper and lower sides of the piezoelectric membrane 132 of the piezoelectric element 13. Therefore, the potential difference occurring between the first electrode 131 and the second electrode 133 is detected, and thus reception of the ultrasonic wave can be detected.

Disposition and Configuration of Ultrasonic Transducer Tr

In the present embodiment, as illustrated in FIG. 2, a plurality of ultrasonic transducers Tr are disposed in an array form along the X direction and the Y direction in the ultrasonic device 10.

In the present embodiment, the first electrode 131 is linearly formed along the X direction, and is coupled to drive terminals 131P provided at ±X ends. In other words, the first electrode 131 is used in common to the ultrasonic transducers Tr adjacent to each other in the X direction, and thus a single channel CH is formed. A plurality of channels CH are disposed along the Y direction. Thus, a separate drive signal can be input to the drive terminals 131P corresponding to each channel CH, and thus each channel CH can be separately driven.

On the other hand, as illustrated in FIG. 2, the second electrode 133 is linearly formed along the Y direction, and ±Y side ends of the second electrodes 133 are coupled to each other and are coupled to a common terminal 133P. The second electrodes 133 are electrically coupled to the drive circuit 30 via the common terminal 133P, and thus an identical common potential is applied thereto.

Configuration of Controller 20

Referring to FIG. 1 again, the controller 20 will be described.

The controller 20 is configured to include a drive circuit 30 driving the ultrasonic device 10, and a calculation unit 40. The controller 20 may include a storage unit storing various pieces of data or various programs for controlling the ultrasonic apparatus 100.

The drive circuit 30 is a driver circuit controlling driving of the ultrasonic device 10, and include, as illustrated in FIG. 1, for example, a reference potential circuit 31, a switching circuit 32, a transmission circuit 33, and a reception circuit 34.

The reference potential circuit 31 is coupled to the common terminal 133P of the second electrodes 133 of the ultrasonic device 10, and applies a reference potential to the second electrodes 133.

The switching circuit 32 is coupled to the drive terminal 131P, the transmission circuit 33, and the reception circuit 34. The switching circuit 32 is formed of a circuit using switching elements, and performs switching between transmission coupling of coupling each drive terminal 131P to the transmission circuit 33 and reception coupling of coupling each drive terminal 131P to the reception circuit 34.

The transmission circuit 33 is coupled to the switching circuit 32 and the calculation unit 40. When the switching circuit 32 switches to the transmission coupling, the transmission circuit 33 outputs a pulsed drive signal to each ultrasonic transducer Tr under the control of the calculation unit 40, and thus transmits an ultrasonic wave from the ultrasonic device 10.

The calculation unit 40 is configured with, for example, a central processing unit (CPU), and controls the ultrasonic device 10 via the drive circuit 30, and thus the ultrasonic device 10 performs ultrasonic wave transmission and reception processes.

In other words, the calculation unit 40 causes the switching circuit 32 to switch to the transmission coupling, and thus drives the ultrasonic device 10 from the transmission circuit 33 to perform an ultrasonic wave transmission process. The calculation unit 40 causes the switching circuit 32 to switch to the reception coupling immediately after the ultrasonic wave is transmitted, and thus the ultrasonic device 10 receives a reflected wave that is reflected from a target object. The calculation unit 40 calculates a distance from the ultrasonic device 10 to the target object according to a time of flight (ToF) method by using a period of time from a transmission timing at which the ultrasonic wave is transmitted from the ultrasonic device 10 to a reception timing at which a received signal is received, and a sonic speed in the air.

Relationship Between Bending Rigidity Ratio Between First Layer 121 and Second Layer 122 and Resonance Frequency Next, a description will be made of a relationship between a bending rigidity ratio between the first layer 121 and the second layer 122 of the vibration plate 12 and a resonance frequency of the ultrasonic transducer Tr.

A frequency of an ultrasonic wave transmitted and received in the ultrasonic transducer Tr substantially matches a resonance frequency of the ultrasonic transducer Tr. In order to adjust the resonance frequency of the ultrasonic transducer Tr to a desired frequency, it is necessary to appropriately set a width of the opening 111 of the element substrate 11 and the rigidity of the vibration plate 12.

FIG. 4 is a graph illustrating a relationship between a width of the opening 111 and a displacement amount of the vibration portion 12A.

In the ultrasonic transducer Tr, when a drive voltage is applied to the piezoelectric element 13, the vibration portion 12A vibrates. As illustrated in FIG. 4, regarding the vibration in the vibration portion 12A, when a width of the opening 111 is equal to or less than 100 μm, as the width is increased, a displacement amount of the vibration portion 12A is increased, that is, displacement efficiency is not reduced.

On the other hand, when the width of the opening 111 exceeds 100 μm, the displacement efficiency is gradually reduced, and, when the width thereof exceeds 200 μm, the displacement efficiency is considerably reduced. This is because an unnecessary vibration mode occurs in the vibration portion 12A when the width of the opening 111 exceeds 100 μm. In other words, in order to output an ultrasonic wave with a high sound pressure from the ultrasonic transducer Tr, the vibration portion 12A is preferably caused to vibrate with an end of the opening 111 as a node and the center of the opening 111 at which the piezoelectric element 13 is disposed as an antinode. However, when the unnecessary vibration mode occurs, a plurality of nodes and antinodes are generated in the vibration plate 12 closing the opening 111, and thus a sound pressure of an ultrasonic wave is reduced. Thus, the width of the opening 111 is preferably equal to or less than 100 μm.

On the other hand, when the width of the opening 111 is equal to or less than 100 μm such that the displacement efficiency of the vibration portion 12A is improved, it is necessary to control a resonance frequency of the ultrasonic transducer Tr by using bending rigidities of the first layer 121 and the second layer 122 forming the vibration plate 12.

For example, when the width of the opening 111 is set to 100 μm, and thus the resonance frequency is more than a desired value, it is necessary to reduce the rigidity of the vibration portion 12A by thinning the vibration plate 12.

In this case, as described above, the second layer 122 is a layer suppressing diffusion of Pb atoms contained in the piezoelectric element 13, and thus there is concern that piezoelectric characteristics of the piezoelectric element 13 may deteriorate when a thickness thereof is reduced. Thus, in order to maintain the piezoelectric characteristics of the piezoelectric element 13, a thickness of the second layer 122 is required to be equal to or more than a defined value such that diffusion of Pb atoms contained in the piezoelectric membrane 132 is suppressed. However, a film thickness of the second layer 122 is set to a value more than the defined value, a probability that peeling between the second layer 122 and the first layer 121 or cracks may occur increases, and thus the piezoelectric element 13 deteriorates. For example, in the present embodiment, the defined value is 400 nm. Therefore, even when a thickness of the vibration plate 12 is made small, the second layer 122 is preferably maintained to have a thickness of about the defined value.

Figure 5:
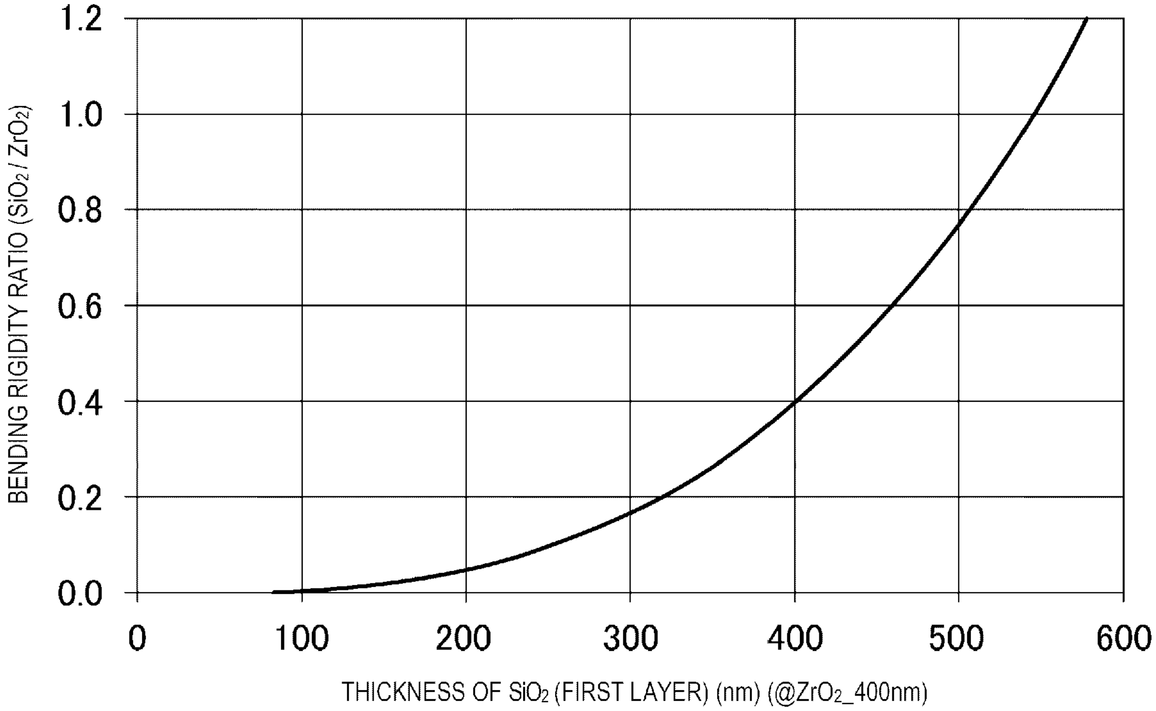
FIG. 5 is a graph illustrating a relationship between a thickness of a first layer and a bending rigidity ratio between a first layer and the second layer when a thickness of the second layer is set to a defined value.

FIG. 5 is a graph illustrating a relationship between a thickness of the first layer 121 and a bending rigidity ratio between the first layer 121 and the second layer 122 when a thickness of the second layer 122 is set to the defined value. The bending rigidity ratio in the present disclosure is a value obtained by dividing a bending rigidity of the first layer 121 by a bending rigidity of the second layer 122 (that is, the bending rigidity of the first layer/the bending rigidity of the second layer).

Figure 6:
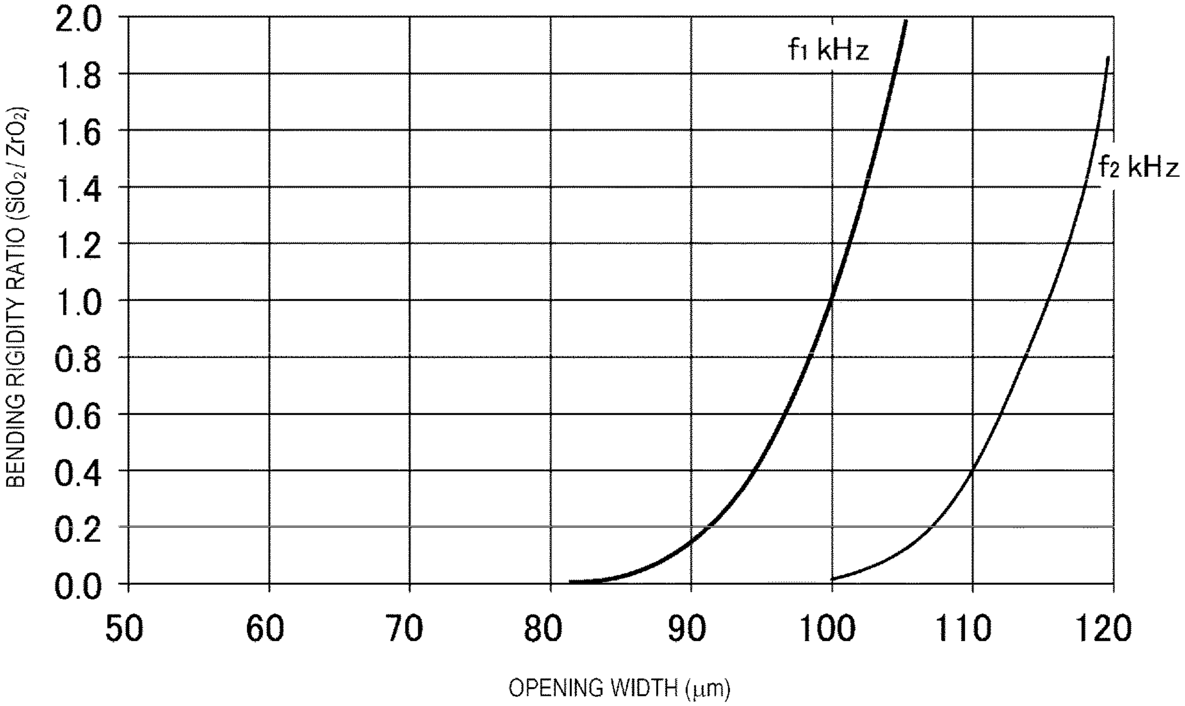
FIG. 6 is a graph illustrating a relationship between a width of an opening and a bending rigidity ratio between the first layer and the second layer when a resonance frequency of an ultrasonic transducer is set to a predetermined frequency.

FIG. 6 is a graph illustrating a relationship between a width of the opening 111 and a bending rigidity ratio (that is, the bending rigidity of the first layer/the bending rigidity of the second layer) between the first layer 121 and the second layer 122 when a resonance frequency of the ultrasonic transducer Tr is set to a predetermined frequency when a thickness of the second layer 122 is fixed to the defined value.

In FIG. 6, a first frequency f1 is a resonance frequency of the ultrasonic transducer Tr when a width of the opening 111 is set to 100 μm, a thickness of the second layer 122 is set to the defined value, and a thickness of the first layer 121 is set such that the bending rigidities of the first layer 121 and the second layer 122 are the same as each other. In other words, the first frequency f1 is a resonance frequency when the bending rigidity ratio is 1. The first frequency f1 changes depending on materials forming the first layer 121 and the second layer 122.

In the present embodiment, when a width of the opening 111 is set to 100 μm, and a resonance frequency of the ultrasonic transducer Tr is set to be lower than the first frequency f1, a thickness of the second layer 122 is set to the defined value. A thickness of the first layer 121 is set such that the bending rigidity ratio is less than 1, and the bending rigidity ratio has a value corresponding to a resonance frequency of the ultrasonic transducer Tr.

The vibration attenuation layer 14 is provided when a resonance frequency of the ultrasonic transducer Tr is set to be lower than a second frequency f2 lower than the first frequency f1.

The second frequency f2 is a resonance frequency of the ultrasonic transducer Tr when a bending rigidity ratio corresponding to the resonance frequency is equal to or less than a predetermined threshold value. For example, in the example illustrated in FIG. 6, when a bending rigidity ratio is 0 when a width of the opening 111 is 100 μm, that is, the first layer 121 is not provided, a resonance frequency of the ultrasonic transducer Tr is set to the second frequency f2.

When a width of the opening 111 is 100 μm, and a resonance frequency of the ultrasonic transducer Tr is set to be lower than the second frequency f2, a thickness of the second layer 122 is required to be small in order to control a resonance frequency by using only a thickness of the vibration plate 12. In this case, piezoelectric characteristics of the piezoelectric element 13 deteriorate. Therefore, in the present embodiment, a thickness of the second layer 122 is maintained to have the defined value, and the vibration attenuation layer 14 is provided, so that a resonance frequency is set.

In FIG. 6, a resonance frequency when an opening width is 100 μm and a bending rigidity ratio is 0 is the second frequency f2, but is not limited thereto. For example, there is a lower limit value in a thickness of the first layer 121 that is formable in the ultrasonic device 10. Therefore, a bending rigidity ratio when a thickness of the first layer 121 is set to the lower limit value and a thickness of the second layer 122 is set to the defined value may be used as a threshold value. In this case, the second frequency f2 is a resonance frequency of the ultrasonic transducer Tr when a thickness of the first layer 121 is set to the lower limit value and a thickness of the second layer 122 is set to the defined value.

A thickness of the vibration attenuation layer 14 provided on the vibration plate 12 is a thickness corresponding to a resonance frequency of the ultrasonic transducer Tr, a width of the opening 111, and a bending rigidity ratio.

When a resonance frequency of the ultrasonic transducer Tr is set to a frequency higher than the first frequency f1, a thickness of the second layer 122 is set to a thickness corresponding to the resonance frequency such that a width of the opening 111 is set to a predetermined value of 100 μm or less, and a bending rigidity ratio between the first layer 121 and the second layer 122 is equal to or less than 1.

When the ultrasonic transducer Tr with a resonance frequency higher than the first frequency f1 is to be obtained, a width of the opening 111 is preferably small up to a width of the formable opening 111. In this case, as illustrated in FIG. 4, a displacement amount of the vibration portion 12A linearly increases at an opening width from 0 to 100 μm, and thus the displacement efficiency does not deteriorate at the opening width from 1 to 100 μm. Peeling between the second layer 122 and the first layer 121 or cracks can be suppressed from occurring by increasing a thickness of the vibration plate 12, and thus it is possible to suppress deterioration in the piezoelectric element 13.

A width of the opening 111, a thickness of the first layer 121, and a thickness of the second layer 122 are set as mentioned above, and thus it is possible to suppress deterioration in the piezoelectric element 13 and also to provide the high performance ultrasonic transducer Tr in which displacement efficiency of the vibration portion 12A is high and an increase of a total thickness of the ultrasonic transducer Tr is suppressed.

Advantageous Effects of Present Embodiment

The ultrasonic apparatus 100 of the present embodiment includes the ultrasonic device 10 and the controller controlling the ultrasonic device 10. The ultrasonic device 10 includes the element substrate 11 having the openings 111, the vibration plate 12 closing the openings 111, and the piezoelectric element 13 disposed on the vibration plate 12. The vibration plate 12 has the first layer 121 laminated on the element substrate 11 and the second layer 122 that is provided between the first layer 121 and the piezoelectric element 13 and suppresses diffusion of a Pb atom that is a component contained in the piezoelectric element 13. A bending rigidity of the second layer 122 is larger than a bending rigidity of the first layer 121. In other words, in the present embodiment, a bending rigidity ratio obtained by dividing the bending rigidity of the first layer 121 by the bending rigidity of the second layer 122 is equal to or less than 1.

In this configuration, since the bending rigidity ratio is equal to or less than 1, it is possible to reduce a total thickness of the vibration plate 12 for setting a resonance frequency to a predetermined value. In other words, when the bending rigidity ratio is equal to or more than 1, a thickness of the first layer 121 is required to be large when a resonance frequency of the ultrasonic transducer Tr is made higher than the first frequency f1, but, in this case, a Young's modulus of the first layer 121 is smaller than a Young's modulus of the second layer 122, and thus it is necessary to excessively increase a thickness of the first layer 121. In contrast, in the present embodiment, a thickness of the second layer 122 with the large Young's modulus may be increased, and thus it is possible to suppress an excessive increase of a total thickness of the vibration plate 12.

In a case where a resonance frequency of the ultrasonic transducer Tr is made lower than the first frequency f1, it is necessary to reduce a thickness of the second layer 122 or to increase a width of the opening 111 when the bending rigidity ratio is equal to or more than 1. In contrast, in the present embodiment, in a state in which the second layer 122 is fixed to the defined value, a thickness of the first layer 121 may be reduced, deterioration in piezoelectric characteristics of the piezoelectric element 13 can be suppressed, and a width of the opening 111 is not required to be changed.

As described above, in the present embodiment, it is possible to provide the ultrasonic device 10 having desired drive characteristics.

In the present embodiment, a width of the opening 111 is equal to or less than 100 μm.

Thus, in the vibration portion 12A, it is possible to suppress a problem that an unnecessary vibration mode occurs and to improve displacement efficiency of the vibration portion 12A.

In the present embodiment, the second layer 122 has a thickness of the defined value or greater such that diffusion of Pb atoms is suppressed and piezoelectric characteristics are maintained.

In other words, in the present embodiment, even when a resonance frequency of the ultrasonic transducer Tr is set to the first frequency f1 or higher or is set to below the first frequency f1, a thickness of the second layer 122 is equal to or more than the defined value. Consequently, deterioration in the performance of the piezoelectric element 13 can be suppressed, and thus it is possible to maintain the performance of the ultrasonic device 10.

In the present embodiment, when a resonance frequency of the ultrasonic transducer Tr is the first frequency f1 at a bending rigidity ratio of 1, when the resonance frequency of the ultrasonic transducer Tr is made lower than the first frequency f1, the second layer 122 has a thickness of the defined value such that diffusion of Pb atoms is suppressed.

In other words, when a resonance frequency of the ultrasonic transducer Tr is made equal to or lower than the first frequency f1, a thickness of the second layer 122 with a large Young's modulus is set to the defined value such that diffusion of Pb atoms can be suppressed, and a thickness of the first layer 121 with a small Young's modulus is set such that a bending rigidity ratio is equal to or less than 1. Consequently, it is possible to provide the ultrasonic transducer Tr having a desired resonance frequency in which deterioration in piezoelectric characteristics of the piezoelectric element 13 is suppressed by the second layer 122.

In the present embodiment, when a resonance frequency of the ultrasonic transducer Tr is equal to or lower than the predetermined second frequency f2 lower than the first frequency f1, the vibration attenuation layer 14 having a thickness corresponding to the resonance frequency is provided on the vibration plate 12.

When a resonance frequency of the ultrasonic transducer Tr is made lower than the second frequency f2, the bending rigidity ratio is required to be lower. However, there is a lower limit value in a thickness of the first layer 121 that is formable on the element substrate 11, and thus it is difficult to form the first layer 121 having a thickness less than the lower limit value. In a case where the vibration plate 12 is formed of only the second layer 122 having a thickness of the defined value, a thickness of the vibration plate 12 cannot be reduced any longer. In contrast, in the present embodiment, in this case, the vibration attenuation layer 14 having a thickness corresponding to a resonance frequency is provided. Consequently, it is possible to provide the ultrasonic transducer Tr having a resonance frequency lower than the second frequency f2.

In the present embodiment, the first layer 121 is made of $SiO_2$, and the second layer 122 is made of $ZrO_2$. When the element substrate 11 is made of Si, thermal oxidation treatment is performed on one surface thereof, and thus the first layer 121 can be easily formed. When PZT is used for the piezoelectric membrane 132 of the piezoelectric element 13, it is possible to suppress diffusion of Pb atoms by using $ZrO_2$ for the second layer 122. Consequently, it is possible to provide the high performance ultrasonic device 10 at low cost.

Modification Examples

The present disclosure is not limited to the embodiments and modification examples, and configurations obtained through modifications, alterations, and combinations of the embodiments within the scope of being capable of achieving the object of the present disclosure are also included in the present disclosure.

In the embodiment, $SiO_2$ is used for the first layer 121 and $ZrO_2$ is used for the second layer 122, but are not limited thereto. In other words, as long as a Young's modulus of the first layer 121 is smaller than a Young's modulus of the second layer 122, materials of the first layer 121 and the second layer 122 are not limited. For example, $Al_2O_3$ or $TiO_2$ may be used for the second layer 122.

As an example, PZT is used for the piezoelectric membrane 132, but various piezoelectric materials such as a perovskite type oxide containing Pb may be used.

In the embodiment, a width of the opening 111 is equal to or less than 100 μm, but may be equal to or less than 200 μm. As illustrated in FIG. 4, displacement efficiency of the vibration portion 12A is reduced when a width of the opening 111 is from 100 μm to 200 μm, but a reduction ratio is low, and the displacement efficiency is considerably reduced when the opening width exceeds 200 μm. Therefore, a width of the opening 111 may be equal to or less than 200 μm.

In the embodiment, a single channel CH is formed of one row of the ultrasonic transducers Tr arranged in the X direction, but the channel CH may be formed of a plurality of ultrasonic transducers Tr arranged in the X direction and the Y direction.

A plurality of channels CH are disposed along the Y direction, but a plurality of channels CH may be disposed along the X direction, and a plurality of channels CH may be disposed in the X direction and the Y direction.

A description has been made of an example in which a single channel CH is formed of a plurality of ultrasonic transducers Tr, but there may be a configuration in which each of the plurality of ultrasonic transducers Tr can be separately driven.

What is claimed is:

1. An ultrasonic device comprising:

a base material that has an opening;

a vibration plate that is provided on the base material and closes the opening; and a piezoelectric element that is provided on the vibration plate, wherein the vibration plate has a first layer provided on the base material and a second layer disposed between the first layer and the piezoelectric element, a vibration attenuation layer is positioned in the opening and in direct contact with the first layer of the vibration plate; and the second layer has a thickness configured to provide a bending rigidity of the second layer that is equal to or larger than a bending rigidity of the first layer.

2. The ultrasonic device according to claim 1, wherein a width of the opening is equal to or less than 100 μm.

3. The ultrasonic device according to claim 2, wherein the second layer has a thickness equal to or more than a predetermined defined value such that piezoelectric characteristics of the piezoelectric element is maintained.

4. The ultrasonic device according to claim 3, further comprising:

an ultrasonic transducer that includes a vibration portion closing the opening in the vibration plate and the piezoelectric element, the ultrasonic transducer having a first frequency that is a resonance frequency, wherein the resonance frequency of the ultrasonic transducer is reduced to less than the first frequency when the thickness of the second layer is set to the predetermined defined value in the ultrasonic device and the bending rigidity of the first layer is the same as the bending rigidity of the second layer.

5. The ultrasonic device according to claim 4, wherein the vibration attenuation layer has a thickness corresponding to the resonance frequency.

6. The ultrasonic device according to claim 1, wherein the first layer is made of $SiO2$, and the second layer is made of $ZrO2$.

7. An ultrasonic apparatus comprising:

the ultrasonic device according to claim 1; and a controller that controls the ultrasonic device.

8. The ultrasonic device according to claim 3, further comprising:

an ultrasonic transducer that includes a vibration portion closing the opening in the vibration plate and the piezoelectric element, the ultrasonic transducer having a first frequency that is a resonance frequency, wherein i) the thickness of the second layer is set to the predetermined defined value in the ultrasonic device;

ii) the bending rigidity of the first layer is the same as the bending rigidity of the second layer;

with i) and ii), the resonance frequency of the ultrasonic transducer is reduced to less than the first frequency.

* * * * *